US011095366B2

(12) United States Patent
Cao (10) Patent No.: US 11,095,366 B2
(45) Date of Patent: Aug. 17, 2021

(54) VISIBLE LIGHT COMMUNICATION APPARATUS, LOCK DEVICE, AND VISIBLE LIGHT COMMUNICATION METHOD

(71) Applicant: BOE Technology Group Co., Ltd., Beijing (CN)

(72) Inventor: Wei Cao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/621,031

(22) PCT Filed: Apr. 19, 2019

(86) PCT No.: PCT/CN2019/083541
§ 371 (c)(1),
(2) Date: Dec. 10, 2019

(87) PCT Pub. No.: WO2020/019772
PCT Pub. Date: Jan. 30, 2020

(65) Prior Publication Data
US 2020/0358529 A1    Nov. 12, 2020

(30) Foreign Application Priority Data

Jul. 24, 2018  (CN) .......................... 201810819895.X (51) Int. Cl.
*H04B 10/116* (2013.01)
*H04B 10/114* (2013.01)
(Continued)

(52) U.S. Cl.
CPC ....... *H04B 10/116* (2013.01); *H04B 10/1143* (2013.01); *H04B 10/50* (2013.01); *H04B 10/697* (2013.01)

(58) Field of Classification Search
None
See application file for complete search history.

(56) References Cited

U.S. PATENT DOCUMENTS

2015/0093107 A1*  4/2015  Jovicic ................ H04B 10/116
                                                              398/25

FOREIGN PATENT DOCUMENTS

| CN | 103590670 A | 2/2014 |
| CN | 105528819 A | 4/2016 |

(Continued)

OTHER PUBLICATIONS

Office Action issued in corresponding 201810819895.X dated Jul. 29, 2019.
(Continued)

*Primary Examiner* — David W Lambert
(74) *Attorney, Agent, or Firm* — Arent Fox LLP; Michael Fainberg (57) ABSTRACT

The present disclosure discloses a visible light communication apparatus, a lock device, and a visible light communication method. The visible light communication method includes: transmitting, by at least two transmitting devices, visible light carrying respective corresponding information; and sending, by a receiving device, an instruction for correct matching upon determining, according to received superposed visible light, that the superposed visible light meets a preset condition; where the corresponding information includes at least one of a frequency, luminance, and a color of the visible light transmitted by the transmitting devices and a relative position of the transmitting devices to the receiving device. The method can improve security of visible light communication.

15 Claims, 4 Drawing Sheets

(51) Int. Cl.
*H04B 10/50* (2013.01)
*H04B 10/69* (2013.01)

(56) References Cited

FOREIGN PATENT DOCUMENTS

| | | | | |
|---|---|---|---|---|
| CN | 107070554 A | | 8/2017 | |
| CN | 107181753 A | * | 9/2017 | |
| CN | 107181753 A | | 9/2017 | |
| CN | 201723008 U1 | | 9/2017 | |
| CN | 107424246 A | * | 12/2017 | ......... G07C 9/00817 |
| CN | 107424246 A | | 12/2017 | |
| CN | 107993315 A | | 5/2018 | |
| CN | 207332516 A | | 5/2018 | |
| CN | 108964763 A | | 12/2018 | |
| WO | 2017152812 A1 | | 1/2011 | |

OTHER PUBLICATIONS

Office Action issued in corresponding 201810819895.X dated Feb. 3, 2020.

* cited by examiner

VISIBLE LIGHT COMMUNICATION APPARATUS, LOCK DEVICE, AND VISIBLE LIGHT COMMUNICATION METHOD

The present disclosure is a US National Stage of International Application No. PCT/CN2019/083541, filed Apr. 19, 2019, which claims priority to the Chinese patent disclosure No. 201810819895.X, filed to the Chinese Patent Office on Jul. 24, 2018 and entitled "VISIBLE LIGHT COMMUNICATION APPARATUS, LOCK DEVICE, AND VISIBLE LIGHT COMMUNICATION METHOD", which is incorporated herein by reference in its entirety.

FIELD

The present disclosure relates to the technical field of semiconductors, and in particular to a visible light communication apparatus, a lock device, and a visible light communication method.

BACKGROUND

Visible light communication (VLC) is a wireless optical communication technology in which information is transmitted by using high-speed bright and dark blinking optical signals that are invisible to naked eyes. The visible light communication not only has advantages of a high transmission speed and a large capacity of ordinary wireless communication, but also is a green and environment-friendly wireless communication technology that has no radiation damage to a human body. The visible light communication technology can be applied in many fields that are not suitable for electromagnetic radiation (such as hospitals, airplanes, and mines). Therefore, security of the visible light communication has attracted much attention of people.

SUMMARY

According to a first aspect, an embodiment of the present disclosure provides a visible light communication method. The method includes: transmitting, by at least two transmitting devices, visible light carrying respective corresponding information; and sending, by a receiving device, an instruction for correct matching when determining, according to received superposed visible light, that the received superposed visible light meets a preset condition; wherein the corresponding information comprises one or a combination of a frequency, luminance, and a color of the visible light transmitted by the transmitting devices and a relative position of the transmitting devices to the receiving device.

Optionally, in the visible light communication method provided by the embodiment of the present disclosure, the transmitting, by the at least two transmitting devices, the visible light carrying respective corresponding information further includes: adjusting the corresponding information corresponding to the respective transmitting devices, so that the visible light transmitted by the respective transmitting devices has different luminance for the receiving device.

Optionally, in the visible light communication method provided by the embodiment of the present disclosure, the adjusting the corresponding information corresponding to the respective transmitting devices, so that the visible light transmitted by the respective transmitting devices has different luminance for the receiving device further includes: adjusting the relative position of the transmitting devices to the receiving device, so that distances between light emitting centers of the transmitting devices and a receiving center of the receiving device are equal; and controlling the respective transmitting devices to transmit the visible light having a same frequency and different luminance.

Optionally, in the visible light communication method provided by the embodiment of the present disclosure, the adjusting the corresponding information corresponding to the respective transmitting devices, so that the visible light transmitted by the transmitting devices has different luminance for the receiving device further includes: adjusting the relative position of the transmitting devices to the receiving device, so that distances between light emitting centers of the transmitting devices and a receiving center of the receiving device are unequal; and controlling the respective transmitting devices to transmit the visible light having a same frequency and same luminance.

Optionally, in the visible light communication method provided by the embodiment of the present disclosure, the transmitting, by the at least two transmitting devices, visible light carrying respective corresponding information includes: simultaneously transmitting, by the transmitting devices, the visible light carrying the respective corresponding information.

Optionally, in the visible light communication method provided by the embodiment of the present disclosure, when colors of visible light transmitted by the at least two transmitting devices are different, the receiving device receives, according to a time sequence in a time sharing manner, the visible light transmitted by the respective transmitting devices.

Optionally, in the visible light communication method provided by the embodiment of the present disclosure, the receiving device receives the visible light having a same color at the same time.

Optionally, in the visible light communication method provided by the embodiment of the present disclosure, the transmitting, by the at least two transmitting devices, the visible light carrying respective corresponding information includes: successively transmitting, by the respective transmitting devices, the visible light carrying the respective corresponding information in sequence.

Optionally, in the visible light communication method provided by the embodiment of the present disclosure, the sending, by the receiving device, the instruction for correct matching upon determining, according to the received superposed visible light, that the superposed visible light meets the preset condition includes: forming, by the receiving device, first signal data according to the received superposed visible light; and sending the instruction for correct matching when determining that the first signal data is matched with pre-stored signal data.

Optionally, in the visible light communication method provided by the embodiment of the present disclosure, the forming, by the receiving device, the first signal data according to the received superposed visible light further includes: performing, by the receiving device, data statistical averaging according to the received superposed visible light; removing noise by filtering a direct current signal; and forming the first signal data by performing binarization processing.

According to a second aspect, an embodiment of the present disclosure further provides a visible light communication apparatus that performs communication by using the visible light communication method provided by the embodiment of the first aspect. The visible light communication apparatus comprises at least two transmitting devices and at least one receiving device.

Each transmitting device is configured to transmit visible light carrying corresponding information of the transmitting device.

The at least one receiving device is configured to send an instruction for correct matching when determining, according to received superposed visible light, that the superposed visible light meets a preset condition.

Optionally, in the visible light communication apparatus provided by the embodiment of the present disclosure, the at least one receiving device is further configured to: form first signal data according to the received superposed visible light; and send the instruction for correct matching when determining that the first signal data is matched with pre-stored signal data.

Optionally, in the visible light communication apparatus provided by this embodiment of the present disclosure, the at least one receiving device is further configured to: perform data statistical averaging according to the received superposed visible light; remove noise by filtering a direct current signal; and form the first signal data by performing binarization processing.

Optionally, in the visible light communication apparatus provided by the embodiment of the present disclosure, the respective transmitting devices are further configured to simultaneously transmit the visible light carrying the respective corresponding information.

Optionally, in the visible light communication apparatus provided by the embodiment of the present disclosure, the respective transmitting devices are further configured to successively transmit the visible light carrying the respective corresponding information in sequence.

According to a third aspect, an embodiment of the present disclosure further provides a lock device, comprising the visible light communication apparatus provided by the embodiment of the present disclosure.

DETAILED DESCRIPTION OF THE EMBODIMENTS

To make the objectives, technical solutions, and advantages of the present disclosure clearer, the following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

Unless otherwise defined, technical terms or scientific terms used in the present disclosure have the ordinary meaning understood by persons of ordinary skill in the art. "First" "second" and a similar word used in the present disclosure do not indicate any order, quantity, or importance, but are used to distinguish different components. "Comprise", "include" or a similar word is indented to indicate that an element or item preceding the word covers an element or item following the word and an equivalent, and does not exclude another element or item. "Connecting", "connected", and a similar word are not limited to a physical or mechanical connection, but may include an electrical connection whether in direct or indirect. "Upper", "lower", "left", "right", etc. are only used to indicate a relative positional relationship, and when an absolute position of a described object is changed, the relative positional relationship may also change accordingly.

To keep the following description of the embodiments of the present disclosure clear and concise, the present disclosure omits detailed descriptions of known functions and known components.

Figure 1:
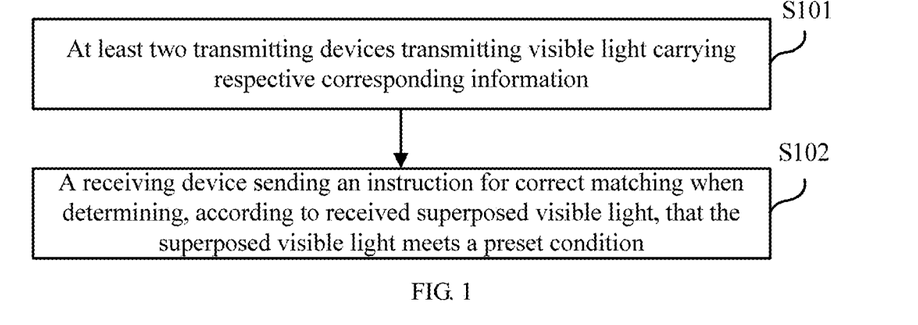
FIG. 1 is a flowchart of a visible light communication method according to embodiments of the present disclosure.

Referring to FIG. 1, an embodiment of the present disclosure provides a visible light communication method. The method includes the following operations.

Step S101: at least two transmitting devices transmit visible light carrying respective corresponding information. In the present disclosure, the light transmitted by the transmitting devices is required to be incoherent. In implementations, each transmitting device may be a light emitting diode (LED). Light transmitted by a LED light source is incoherent, and therefore, light illuminated on a receiving plane can be directly non-coherently superposed.

When the visible light is transmitted, the visible light is generally transmitted with a certain frequency or a certain light intensity and a corresponding color. Therefore, the visible light can be distinguished by different frequencies, light intensities, and colors. That is, it can be implemented that different transmitting devices transmit visible light carrying respective corresponding information. The respective corresponding information may include: one or a combination of a frequency, an intensity, a color of the visible light transmitted by the transmitting devices and a relative position of the transmitting devices to the receiving device.

Step S102: a receiving device sends an instruction for correct matching when determining, according to received superposed visible light, that the superposed visible light meets a preset condition.

In implementations, the receiving device may include a receiving component and a processing component. The receiving component is configured to: receive the visible light, and transmit the received visible light to the processing component. The processing component may be configured to: process the received visible light, and send an instruction for correct matching when determining that the processed visible light satisfies the preset condition.

When the visible light communication method is used in a smart lock device, the receiving component may be a photodetector, and the processing component may be any one of a central processing unit and a single-chip microcomputer, or a circuit board or a module including any one of a central processing unit and a single-chip microcomputer.

In addition, the receiving device may also include a driving component. The driving component may be a driving motor, may be configured to receive the instruction for correct matching sent by the processing component, and may be configured to: drive a mechanical component in the corresponding door lock to rotate and/or move for unlocking when receiving the instruction for correct matching.

Certainly, when the visible light communication method is applied to other aspects, the receiving device may further include another corresponding component that can receive the instruction for correct matching sent by the processing component. This is not limited in the present disclosure.

In the embodiments of the present disclosure, at least two transmitting devices transmit visible light carrying respective corresponding information, and a receiving device sends an instruction for correct matching when determining, according to received superposed visible light, that the superposed visible light meets a preset condition. That is, a function of forming a more complex composite electrical signal at the receiving end is implemented by superposing different optical signals transmitted by a plurality of visible light transmitting ends. When only any one transmitting device transmits visible light, the receiving end does not perform corresponding operations, and communication cannot be implemented, so that security of visible light communication is improved.

Optionally, in the visible light communication provided by the embodiments of the present disclosure, in order to further enhance security in a visible light communication process, corresponding information corresponding to the transmitting devices may be adjusted, so that the visible light transmitted by the transmitting devices has different luminance for the receiving device, and the receiving device end forms more abundant and complex information.

In the visible light communication method provided by the embodiments of the present disclosure, that the corresponding information corresponding to the transmitting devices is adjusted, so that the visible light transmitted by the transmitting devices has different luminance for the receiving device includes one or a combination of following manners.

In a first manner: the relative position of the transmitting devices to the receiving device is adjusted, so that distances between light emitting centers of the transmitting devices and a receiving center of the receiving device are equal; and the transmitting devices are controlled to transmit the visible light having a same frequency and different luminous intensities.

In addition to the first manner, due to optical loss during transmission, when the transmitting device is farther away from the receiving device, the optical loss is larger, that is, luminance received by the receiving device is lower. Therefore, a distance between each transmitting device and the receiving device can be adjusted to adjust the intensity of the light transmitted by each transmitting device and illuminated on the receiving device.

In a second manner: the relative position of the transmitting devices to the receiving device is adjusted, so that distances between light emitting centers of the transmitting devices and a receiving center of the receiving device are unequal; and the transmitting devices are controlled to transmit the visible light having a same frequency and a same luminous intensity.

It can be implemented, in the above two specific manners, that the visible light transmitted by the transmitting devices may have different luminance for the receiving device. How to make a selection in actual use is determined according to an actual use condition. Certainly, a specific luminous intensity of each transmitting device and a specific distance between each transmitting device and the receiving device can be set as required according to a specific implementation.

Optionally, in the visible light communication method provided by the embodiment of the present disclosure, that at least two transmitting devices transmit visible light carrying respective corresponding information includes: simultaneously transmitting, by the transmitting devices, the visible light carrying the respective corresponding information.

Specifically, in the visible light communication method provided by the embodiment of the present disclosure, when the transmitting devices simultaneously transmit the respective corresponding visible light, the receiving device may receive superposed light transmitted by the transmitting devices at the same time, and perform processing on the superposed light, to form first signal data.

Optionally, in the visible light communication method provided by the embodiment of the present disclosure, when colors of the visible light transmitted by the at least two transmitting devices are different, the receiving device receives, according to a time sequence in a time sharing manner, the visible light transmitted by the transmitting devices.

In the visible light communication method provided by the embodiment of the present disclosure, when the receiving device can receive, according to a time sequence in a time sharing manner, the visible light transmitted by different transmitting devices, the receiving device may include a plurality of photodetectors, and a corresponding filter film is disposed at a receive end of each photodetector, and each photodetector can only receive light of one color. When a plurality of transmitting devices simultaneously transmits light of a same color, the light of a same color is distinguished by using luminance of the transmitted light, which refers to the above embodiments.

Optionally, in the visible light communication method provided by the embodiment of the present disclosure, the receiving device receives only the visible light of one color at the same time. For example, only red light is received in a first time period, only blue light is received in a second time period, and only green light is received in a third time period. The light received in the time periods is processed to form superposed light, and then the first signal data is formed according to the superposed light.

Optionally, in the visible light communication method provided by the embodiments of the present disclosure, that at least two transmitting devices transmit visible light carrying respective corresponding information includes: successively transmitting, by the transmitting devices, the visible light carrying the respective corresponding information in sequence.

When the transmitting devices successively transmit the visible light carrying the respective corresponding information, the receiving device receives, in real time, the visible light transmitted by the transmitting devices, forms superposed light according to a receiving time, and then forms first signal data according to the superposed light.

Figure 2:
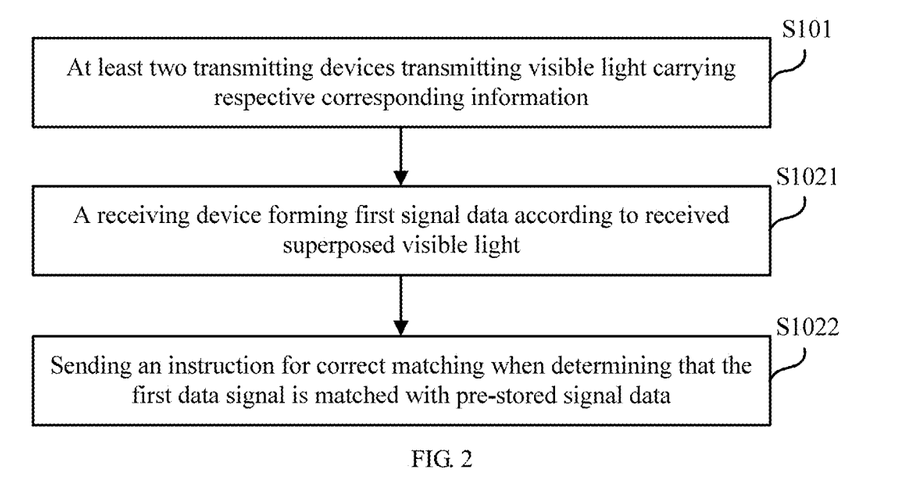
FIG. 2 is a flowchart of another visible light communication method according to embodiments of the present disclosure.

In implementations, since the visible light may be interfered during a transmission process by other optical signals in an environment, in order to enable the receiving device to accurately and effectively identify an effective optical signal, referring to FIG. 2, S102, that the receiving device sends an instruction for correct matching when determining, according to received superposed visible light, that the superposed visible light meets a preset condition includes: S1021: the receiving device forms first signal data according to the received superposed visible light.

Forming first signal data by the receiving device according to the received superposed visible light includes: the receiving device performs data statistical averaging according to the received visible light, where for example, the photodetector of the receiving device can receive and detect the visible light, and forms a waveform graph of changes in luminance with time, and because the waveform graph corresponds to multiple sets of data, statistical averaging can be performed on the data corresponding to the received visible light; noise can be removed by filtering a direct current signal, where for example, a noise signal of an external environment is removed by removing data corresponding to the direct current signal, to obtain a more accurate real signal; and binarization processing is performed to form the first signal data, that is, threshold division may be first performed according to the noise-removed data, and binarization is performed on the data according to a threshold obtained through division, for example, data belonging to a certain threshold range is 1, and data belonging to another threshold range is 0, so that the first signal data is formed.

Thresholding processing may also be performed before threshold division. In implementations, the photodetector can detect the waveform graph of changes in luminance with time on one side of the receiving device, and the waveform graph is corresponding to multiple sets of data, so that the data corresponding to the received visible light can be processed.

S1022: the receiving device sends the instruction for correct matching when determining the first signal data is matched with pre-stored signal data.

In implementations, S101, at least two transmitting devices transmit visible light carrying respective corresponding information, may be that at least two transmitting devices simultaneously transmit the visible light carrying the respective corresponding information; or may be that at least two transmitting devices successively transmit the visible light carrying the respective corresponding information.

For example, the transmitting devices include a first transmitting device and a second transmitting device. When transmitting is performed, the first transmitting device may first transmit visible light carrying corresponding information of the first transmitting device, and then the second transmitting device transmits visible light carrying corresponding information of the second transmitting device.

When the at least two transmitting devices simultaneously transmit the visible light carrying the respective corresponding information, the receiving end receives directly a superposed visible light signal. When the at least two transmitting devices successively transmit the visible light carrying the respective corresponding information, the visible light transmitted by the transmitting devices can be superposed by performing processing on data corresponding to the visible light.

In implementations, before the transmitting devices are in communication with the receiving device, that is, before the at least two transmitting devices transmit the visible light carrying the respective corresponding information, the pre-stored signal data may be first formed by pre-debugging.

That is, the respective transmitting devices simultaneously transmit visible light carrying respective corresponding information, and the receiving device forms pre-stored signal data according to received superposed visible light, and saves the pre-stored signal data. At the same time, during pre-debugging, state parameters are also recorded when the transmitting devices transmit the visible light. The state parameters may include, for example, a position of each transmitting device, a light intensity of transmitted visible light, a frequency of transmitted visible light, and a color of transmitted visible light. In subsequent communication, according to the recorded state parameters during pre-debugging, each transmitting device transmits visible light in a case in which each transmitting device has state parameters the same as that during debugging (that is, a position of each transmitting device at the time of formal communication, a light intensity of transmitted visible light, a frequency of transmitted visible light, and a color of transmitted visible light are all the same as that during debugging). The receiving device forms the first signal data according to the received superposed visible light by using the same information processing method in which the pre-stored signal data is formed during debugging, and sends the instruction for correct matching when determining that the first signal data is matched with the pre-stored signal data. If state parameters when any transmitting device transmits the visible light are different from that during pre-debugging, the first signal data matching the pre-stored signal data cannot be formed, and then the receiving device will not send the instruction for correct matching.

The following describes examples in which the transmitting devices include two LED light sources and a transmitting circuit. The receiving device includes a photodetector and a processing component. The LED light sources simultaneously transmit a visible light signal carrying respective corresponding information. The photodetector placed in an illumination intersection area of illuminated planes can receive light signals of different intensities from the light sources in a manner such as adjusting a placement position and/or intensities of the light sources. The visible light communication method provided by the embodiments of the present disclosure is described by using examples with reference to embodiments.

Figure 3:
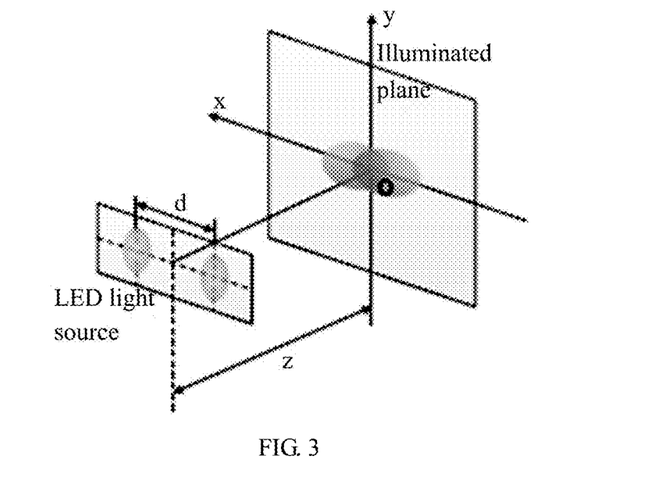
FIG. 3 is a schematic perspective structural diagram of a visible light communication principle according to embodiments of the present disclosure.
Figure 4:
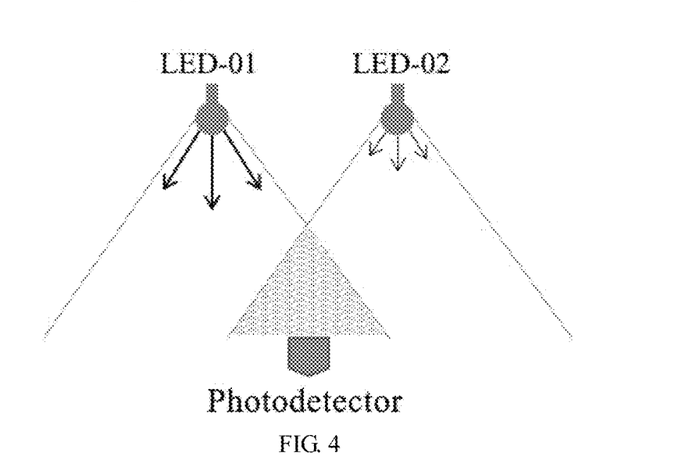
FIG. 4 is a schematic plane structural diagram of a visible light communication principle corresponding to FIG. 3.

Embodiment 1: as shown in FIG. 3 and FIG. 4, FIG. 4 is a plane top view of FIG. 3. Two LED light sources (i.e. an LED-01 and an LED-02) are placed at a position with a same distance from a photodetector. A distance between a plane at which the two LED light sources are located and a plane at which the photodetector is located is z. A center distance between the two LED light sources is d (specific values of d and z can be set according to specific needs). The photodetector placed at an illumination intersection area of an illuminated plane (an x-y plane in FIG. 3) (for example, a position of the photodetector is at o) can receive, by adjusting a transmitting circuit, different intensities of optical signals transmitted by the LED-01 and the LED-02. If a distance between the light source LED-01 and the photodetector is equal to a distance between the light source LED-02 and the photodetector, and a luminous intensity of the LED-01 is different from a luminous intensity of the LED-02, then the photodetector will detect different light signals from the two light sources in an overlapping area of illumination ranges of the two LED light sources. The two LEDs start to perform bright and dark blinking at the same time by controlling the transmitting circuit. For example, luminance of the LED-01 and the LED-02 for the photodetector are respectively 4000 lux and 3000 lux by controlling the transmitting circuit.

Figure 5:
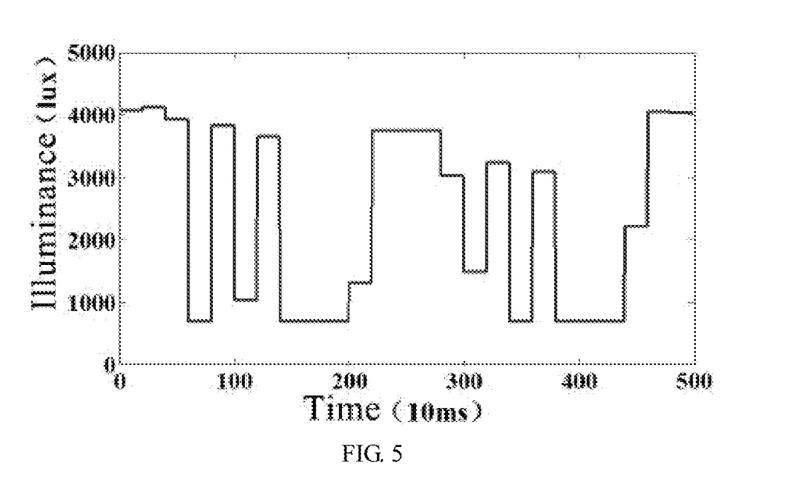
FIG. 5 is a schematic diagram of distribution of luminance of an LED-01 with time received by a photodetector according to embodiments of the present disclosure.
Figure 6:
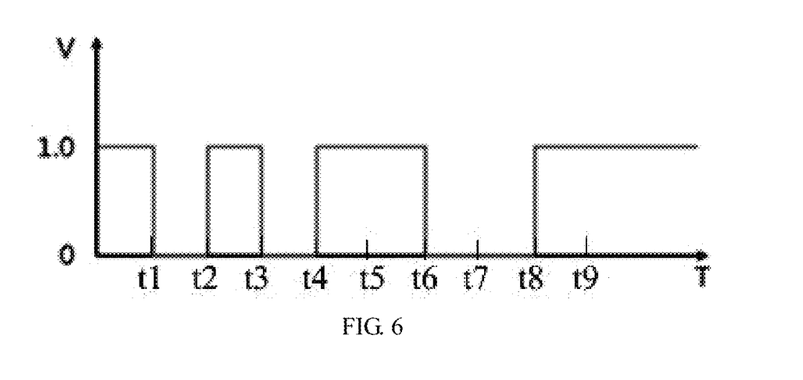
FIG. 6 is a schematic diagram of a data signal obtained after visible light of an LED-01 received by a photodetector is processed according to embodiments of the present disclosure.
Figure 7:
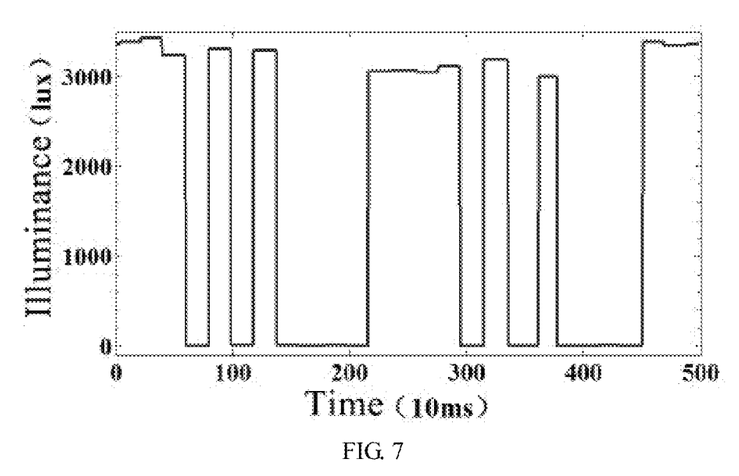
FIG. 7 is a schematic diagram of distribution of luminance of an LED-02 with time received by a photodetector according to embodiments of the present disclosure.
Figure 8:
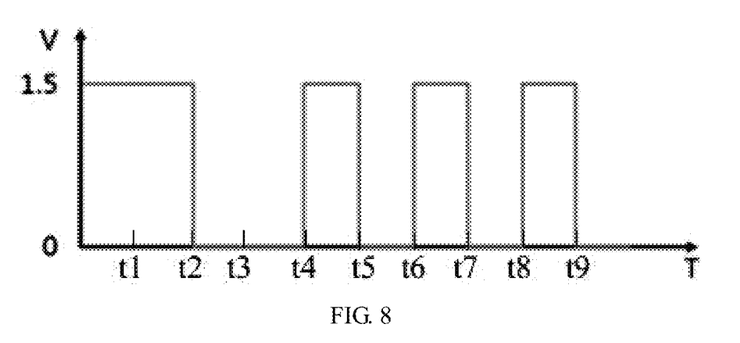
FIG. 8 is a schematic diagram of a data signal obtained after visible light of an LED-02 received by a photodetector is processed according to embodiments of the present disclosure.

When only the LED-01 blinks, a graph of changes of luminance with time detected by the photodetector is assumed to be FIG. 5. The processing component in the receiving device processes the received visible light, and a graph obtained after processing is shown in FIG. 6. In implementations, because the photodetector generally outputs a waveform graph of luminance and time, and the waveform graph is generally corresponding to multiple sets of data, statistical averaging is performed on the original data corresponding to the waveform graph detected by the photodetector, most of the environmental background noise is removed by filtering a direct current signal, thresholding processing is performed, and binarization is performed on the obtained signal data through threshold division. Similarly, for the LED-02, a graph of changes in luminance with time detected by the photodetector is assumed to be FIG. 7. The graph obtained after processing by using the above similar processing manner is shown in FIG. 8. When both the LED-01 and the LED-02 are dark, the luminance is 0. When the LED-01 is bright and the LED-02 is dark, or the LED-01 is dark and the LED-02 is bright, the luminance is 3000 or 4000 lux. When both the LED-01 and the LED-02 are bright, the luminance is 7000 lux.

When the LED-01 and the LED-02 separately transmit the visible light in the above manner, the waveform actually detected by the detector should have the following superposition process.

Figure 9:
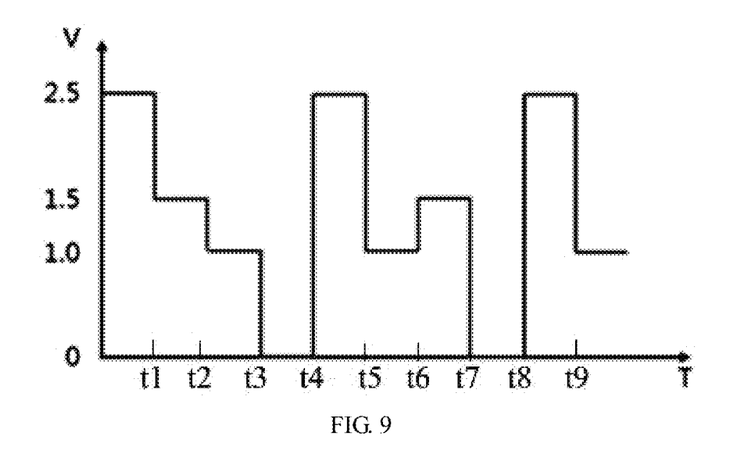
FIG. 9 is a schematic diagram of visible light data signals obtained after visible light transmitted by two light sources are superposed according to embodiments of the present disclosure.

In a time period of 0-t1, a voltage of the LED-01 after conversion is 1.0 V (refer to FIG. 6), a voltage of the LED-02 after conversion is 1.5 V (refer to FIG. 8), and a voltage obtained by superposition of the two is a sum of the two, that is, 2.5 V (see FIG. 9). In a time period of t1-t2, a voltage of the LED-01 after conversion is 0 V (refer to FIG. 6), a voltage of the LED-02 after conversion is 1.5 V (refer to FIG. 8), and a voltage obtained by superposition of the two is a sum of the two, that is, 1.5 V (refer to FIG. 9). In a time period of t2-t3, a voltage of the LED-01 after conversion is 1.0 V (refer to FIG. 6), a voltage of the LED-02 after conversion is 0 V (refer to FIG. 8), and a voltage obtained by superposition of the two is a sum of the two, that is, 1.0V (refer to FIG. 9). In a time period of t3-t4, a voltage of the LED-01 after conversion is 0 V (refer to FIG. 6), a voltage of the LED-02 after conversion is 0 V (refer to FIG. 8), and a voltage obtained by superposition of the two is a sum of the two, that is, 0 V (refer to FIG. 9). In a time period of t4-t5, a voltage of the LED-01 after conversion is 1.0 V (refer to FIG. 6), a voltage of the LED-02 after conversion is 1.5 V (refer to FIG. 8), and a voltage obtained by superposition of the two is a sum of the two, that is, 2.5 V (refer to FIG. 9).

In a time period of t5-t6, a voltage of the LED-01 after conversion is 1.0 V (refer to FIG. 6), a voltage of the LED-02 after conversion is 0 V (refer to FIG. 8), and a voltage obtained by superposition of the two is a sum of the two, that is, 1.0 V (refer to FIG. 9). In a time period of t6-t7, a voltage of the LED-01 after conversion is 0 V (refer to FIG. 6), a voltage of the LED-02 after conversion is 1.5 V (refer to FIG. 8), and a voltage obtained by superposition of the two is a sum of the two, that is, 1.5 V (refer to FIG. 9). In a time period of t7-t8, a voltage of the LED-01 after conversion is 0 V (refer to FIG. 6), a voltage of the LED-02 after conversion is 0 V (refer to FIG. 8), and a voltage obtained by superposition of the two is a sum of the two, that is, 0 V (refer to FIG. 9). In a time period of t8-t9, a voltage of the LED-01 after conversion is 1.0 V (refer to FIG. 6), a voltage of the LED-02 after conversion is 1.5 V (refer to FIG. 8), and a voltage obtained by superposition of the two is a sum of the two, that is, 2.5 V (refer to FIG. 9). Information transmitted by a new waveform obtained after superposition is the information that is ultimately desired to obtain.

It shall be noted that the separate transmission and reception of the LED-01 and the LED-02 are respectively described above for the purpose of more clearly explaining a superposition principle. In actual detection, when two light sources simultaneously transmit visible light, a waveform diagram of the visible light that is transmitted by the two light sources and on which superposition is performed is detected, and the same data processing process as the above is performed on the received waveform graph obtained after superposition to form first signal data. When the first signal data is matched with pre-stored signal data, an instruction for correct matching is sent.

The visible light communication method provided by the embodiment of the present disclosure may be specifically applied to a smart lock device. In a special scenario in which multiple persons are required to be present at the same time to unlock the lock device, each user is equipped with a transmitting device. When the lock device needs to be unlocked, transmitting devices of all users simultaneously transmit visible light carrying respective corresponding information. A receiving device is disposed in the smart lock device, and the receiving device sends an instruction for correct matching when determining, according to superposed visible light transmitted by the transmitting devices of the users, that the superposed visible light meets a preset condition. When receiving the instruction for correct matching, a driving component in the smart lock device drives a mechanical component in the lock device to rotate and/or move to implement unlocking. However, the optical signal transmitted by each transmitting device cannot individually be used for unlocking. Only when the transmitting devices of all users work together at the same time, after the generated optical signals are superposed and converted into new electrical signals by a receiver, the smart lock device can be unlocked.

Figure 10:
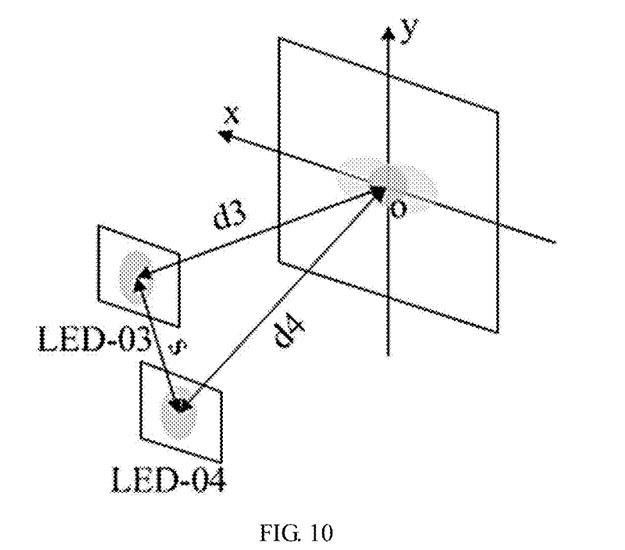
FIG. 10 is a schematic perspective structural diagram of another visible light communication principle according to embodiments of the present disclosure.
Figure 11:
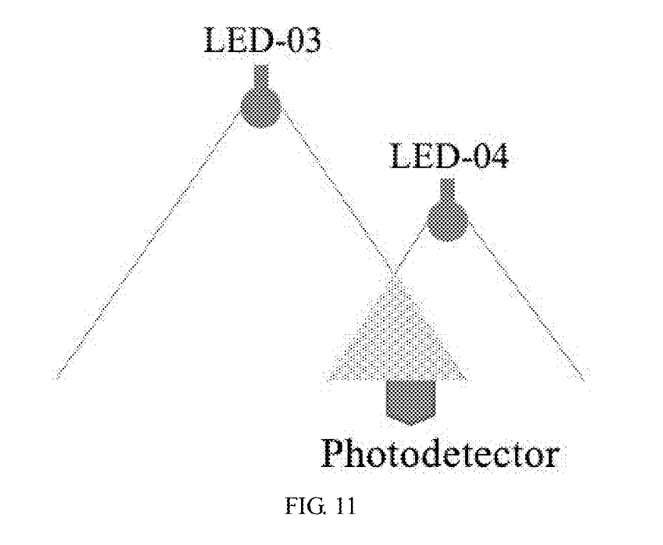
FIG. 11 is a schematic plane structural diagram of a visible light communication principle corresponding to FIG. 10.

Embodiment 2: referring to FIG. 10 and FIG. 11, FIG. 11 is a plane top view of FIG. 10. The photodetector is located at the origin o of the x-y plane. A light source LED-03 is located at a position with a distance of d3 from the detector, a light source LED-04 is located at a position with a distance of d4 from the detector, and d3 and d4 are not equal. A distance between the light source LED-03 and the light source LED-04 is s, and s is not equal to zero (specific values of d3, d4, and s can be set according to specific needs). If a distance between a light source center of the LED-03 and the photodetector is not equal to a distance between a light source center of the LED-04 and the photodetector, even if the two LED lights have a same luminance, the photodetector can receive signals of different light intensities. A specific superposition principle can be similar to that in Embodiment 1, and details are not repeated herein. The photodetector specifically directly receives the superposed visible light of the LED-03 and the LED-04, and a processing component in the receiving device processes the received visible light. In a specific implementation, because the photodetector generally outputs a waveform graph of luminance and time, and the waveform graph is generally corresponding to multiple sets of data, statistical averaging is performed on the original data corresponding to the waveform graph detected by the photodetector, most of the environmental background noise is removed by filtering a direct current signal, thresholding processing is performed, and binarization is performed on the obtained signal data through threshold division, to obtain the processed first signal data. When the first signal data is matched with pre-stored signal data, an instruction for correct matching is sent.

Based on a same inventive concept, an embodiment of the present disclosure further provides a visible light communication apparatus, including at least two transmitting devices and a receiving device.

Each transmitting device is configured to transmit visible light carrying corresponding information of the transmitting device. Specifically, a plurality of transmitting devices may simultaneously transmit the visible light. In a specific implementation, the transmitting devices may simultaneously transmit the visible light carrying respective corresponding information, or the transmitting devices may successively transmit the visible light carrying respective corresponding information.

The receiving device is configured to transmit an instruction for correct matching when determining, according to received superposed visible light, that the superposed visible light meets a preset condition.

Optionally, the receiving device is configured to: form first signal data according to the received superposed visible light; and transmit the instruction for correct matching when determining that the first signal data is matched with pre-stored signal data.

Optionally, the receiving device is configured to: perform data statistical averaging according to the received superposed visible light; remove noise by filtering a direct current signal; and form the first signal data by performing binarization processing.

An embodiment of the present disclosure further provides a lock device, including the visible light communication apparatus provided by an embodiment of the present disclosure.

Specifically, each transmitting device may include an LED light source. Certainly, it should be understood that each transmitting device may further include a transmitting circuit to control the LED light source to transmit visible light having a certain frequency and a certain luminance. A receiving device may include a receiving component and a processing component. The receiving component is configured to receive the visible light and transmit the received visible light to the processing component. The processing component may be configured to process the received visible light, and send an instruction for correct matching when determining that the processed visible light meets a preset condition. When the visible light communication method is used in the smart lock device, the receiving component may specifically be a photodetector, and the processing component may be any one of a central processing unit and a single-chip microcomputer, or a circuit board or a module including any one of a central processing unit and a single-chip microcomputer.

In addition, the receiving device may further include a driving component. The driving component may specifically be a driving motor, and may be specifically configured to receive the instruction for correct matching sent by the processing component, and may be configured to drive, when the instruction for correct matching is received, a mechanical component in the corresponding door lock to rotate and/or move for unlocking. Certainly, when the visible light communication method is applied to other aspects, the receiving device may further include other corresponding components that can receive the instruction for correct matching sent by the processing component. This is not limited in the present disclosure.

Beneficial effects of the embodiments of the present disclosure are as follows: in the embodiments of the present disclosure, the at least two transmitting devices transmit the visible light carrying the respective corresponding information, and the receiving device sends the instruction for correct matching when determining, according to received superposed visible light, that the superposed visible light meets a preset condition. That is, a function of forming a more complex composite electrical signal at the receiving end is implemented by superposing different optical signals transmitted by a plurality of visible light transmitting ends. when only any one transmitting device transmits visible light, the receiving end does not perform corresponding operations, and communication cannot be implemented, so that security of visible light communication is improved.

Apparently, persons skilled in the art can make modifications and variations for the present disclosure without departing from the spirit and the scope of the present disclosure. The present disclosure is intended to cover these modifications and variations provided that they fall within the scope of protection defined by the following claims and their equivalent technologies.

The invention claimed is:

1. A visible light communication method, comprising:
transmitting, by at least two transmitting devices, visible light carrying respective corresponding information; and
sending, by a receiving device, an instruction for correct matching upon determining, according to received superposed visible light, that the superposed visible light meets a preset condition;
wherein, the corresponding information comprises at least one of a frequency, luminance, and a color of the visible light transmitted by the transmitting devices and a relative position of the transmitting devices to the receiving device;
wherein the transmitting, by the at least two transmitting devices, the visible light carrying respective corresponding information further comprises:
adjusting the corresponding information corresponding to the respective transmitting devices, so that the visible light transmitted by the respective transmitting devices has different luminance for the receiving device.

2. The visible light communication method according to claim 1, wherein the adjusting the corresponding information corresponding to the respective transmitting devices, so that the visible light transmitted by the respective transmitting devices has different luminance for the receiving device further comprises:

adjusting the relative position of the transmitting devices to the receiving device, so that distances between light emitting centers of the transmitting devices and a receiving center of the receiving device are equal; and controlling the respective transmitting devices to transmit the visible light having a same frequency and different luminance.

3. The visible light communication method according to claim 1, wherein the adjusting the corresponding information corresponding to the respective transmitting devices, so that the visible light transmitted by the respective transmitting devices has different luminance for the receiving device further comprises:

adjusting the relative position of the transmitting devices to the receiving device, so that distances between light emitting centers of the transmitting devices and a receiving center of the receiving device are unequal; and controlling the respective transmitting devices to transmit the visible light having a same frequency and same luminance.

4. The visible light communication method according to claim 1, wherein the transmitting, by the at least two transmitting devices, the visible light carrying respective corresponding information comprises:

simultaneously transmitting, by the transmitting devices, the visible light carrying the respective corresponding information.

5. The visible light communication method according to claim 4, wherein when colors of the visible light transmitted by the at least two transmitting devices are different, the receiving device receives, according to a time sequence in a time sharing manner, the visible light transmitted by the respective transmitting devices.

6. The visible light communication method according to claim 5, wherein the receiving device receives the visible light having a same color at the same time.

7. The visible light communication method according to claim 1, wherein the transmitting, by the at least two transmitting devices, the visible light carrying respective corresponding information comprises:

successively transmitting, by the respective transmitting devices, the visible light carrying the respective corresponding information in sequence.

8. The visible light communication method according to claim 1, wherein the sending, by the receiving device, the instruction for correct matching upon determining, according to the received superposed visible light, that the superposed visible light meets the preset condition comprises:

forming, by the receiving device, first signal data according to the received superposed visible light; and sending the instruction for correct matching upon determining that the first signal data is matched with pre-stored signal data.

9. The visible light communication method according to claim 8, wherein the forming, by the receiving device, the first signal data according to the received superposed visible light further comprises:

performing, by the receiving device, data statistical averaging according to the received superposed visible light;

removing noise by filtering a direct current signal; and forming the first signal data by performing binarization processing.

10. A visible light communication apparatus, comprising: at least two transmitting devices and a receiving device, wherein the respective transmitting devices are configured to transmit visible light carrying corresponding information of the respective transmitting devices; and the receiving device is configured to send an instruction for correct matching upon determining, according to received superposed visible light, that the superposed visible light meets a preset condition;

wherein the corresponding information comprises at least one of a frequency, luminance, and a color of the visible light transmitted by the transmitting devices and a relative position of the transmitting devices to the receiving device;

wherein the respective transmitting devices are configured to adjust the corresponding information corresponding to the respective transmitting devices, so that the visible light transmitted by the respective transmitting devices has different luminance for the receiving device.

11. The visible light communication apparatus according to claim 10, wherein the receiving device is further configured to:

form first signal data according to the received superposed visible light; and send the instruction for correct matching upon determining that the first signal data is matched with pre-stored signal data.

12. The visible light communication apparatus according to claim 11, wherein the receiving device is further configured to:

perform data statistical averaging according to the received superposed visible light;

remove noise by filtering a direct current signal; and form the first signal data by performing binarization processing.

13. The visible light communication apparatus according to claim 10, wherein the respective transmitting devices are further configured to simultaneously transmit the visible light carrying the respective corresponding information.

14. The visible light communication apparatus according to claim 10, wherein the respective transmitting devices are further configured to successively transmit the visible light carrying the respective corresponding information in sequence.

15. A lock device, comprising a visible light communication apparatus, wherein the visible light communication apparatus comprises: at least two transmitting devices and a receiving device, wherein the respective transmitting devices are configured to transmit visible light carrying corresponding information of the respective transmitting devices; and the receiving device is configured to send an instruction for correct matching upon determining, according to received superposed visible light, that the superposed visible light meets a preset condition;

wherein the corresponding information comprises at least one of a frequency, luminance, and a color of the visible light transmitted by the transmitting devices and a relative position of the transmitting devices to the receiving device;

wherein the respective transmitting devices are configured to adjust the corresponding information corresponding to the respective transmitting devices, so that the visible light transmitted by the respective transmitting devices has different luminance for the receiving device.

* * * * *